United States Patent
Lorenz et al.

(10) Patent No.: US 9,893,826 B2
(45) Date of Patent: Feb. 13, 2018

(54) METHOD FOR RETAINING CLOCK TRACEABILITY OVER AN ASYNCHRONOUS INTERFACE

(71) Applicant: Alcatel-Lucent USA Inc., Murray Hill, NJ (US)

(72) Inventors: Diana L. Lorenz, Naperville, IL (US); Kenneth Y. Ho, New Providence, NJ (US); Greg Martin, Lisle, IL (US); Mark G. Bradac, Genoa, IL (US); Robert A. Novotny, Naperville, IL (US); Wayne R. Wilcox, Oswego, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/607,659

(22) Filed: Jan. 28, 2015

(65) Prior Publication Data
US 2016/0218818 A1 Jul. 28, 2016

(51) Int. Cl.
*H04J 3/06* (2006.01)
*H04L 12/40* (2006.01)

(52) U.S. Cl.
CPC ............ *H04J 3/065* (2013.01); *H04J 3/0632* (2013.01); *H04J 3/0661* (2013.01); *H04J 3/0697* (2013.01); *H04L 12/40* (2013.01); *H04L 12/40045* (2013.01)

(58) Field of Classification Search
CPC .............................. H04J 3/0632; H04L 69/04
USPC .................................................. 375/354, 376
See application file for complete search history.

(56) References Cited

U.S. PATENT DOCUMENTS

| | | | | |
|---|---|---|---|---|
| 7,289,538 B1 * | 10/2007 | Paradise | ............... | H04J 3/0632 370/497 |
| 2010/0027567 A1 * | 2/2010 | Teramoto | .............. | H04J 3/0632 370/516 |
| 2013/0243113 A1 * | 9/2013 | Taghivand | ............. | H03B 19/14 375/295 |
| 2013/0297774 A1 * | 11/2013 | Pope | ..................... | H04L 47/286 709/224 |
| 2015/0207740 A1 * | 7/2015 | Jamond | ................... | H04L 69/04 398/58 |

* cited by examiner

*Primary Examiner* — Kevin M Burd
(74) *Attorney, Agent, or Firm* — Loza & Loza, LLP (57) ABSTRACT

Network elements within a network are configured to retain clock traceability over an asynchronous interface. The network elements can generate and process multi-frames that include two different types of traffic, each synchronized to a different respective clock source. Each of the multi-frames is synchronized to the clock source of one of the traffic types and further includes a timestamp to enable the original clock signal of the other traffic type to be reconstructed at the receiving network element.

7 Claims, 5 Drawing Sheets

METHOD FOR RETAINING CLOCK TRACEABILITY OVER AN ASYNCHRONOUS INTERFACE

BACKGROUND OF THE INVENTION

Technical Field of the Invention

This invention relates generally to communication networks and in particular to carrying different types of traffic over the same medium.

Description of Related Art

Mutually asynchronous traffic deriving its timing from two or more sources is traditionally transported over separate transport media to ensure proper timing is maintained at the receiving network device. However, providing separate transport media increases the cost and requires separate interfaces to be installed at both the transmitting network device and the receiving network device.

For example, Ethernet traffic and non-Ethernet traffic deriving their timing from different sources are currently transported over different media. If the Ethernet traffic and non-Ethernet traffic could be transported over the same media, the number of optical fibers that need to be deployed in the network could be reduced, thereby resulting in significant savings to the customer.

However, providing clock traceability for traffic deriving its timing from multiple sources has proven difficult. For example, Common Public Radio Interface (CPRI) links typically transport CPRI traffic between the radio equipment control (REC) and radio equipment (RE) of wireless basestations. Carrying Synchronous Ethernet traffic on the same medium as the CPRI traffic necessitates maintaining the stringent timing requirements of both.

In order to retain clock traceability for both Ethernet traffic and non-Ethernet traffic over a medium deriving its timing from the timing source of the non-Ethernet traffic (e.g., CPRI traffic), the receiving network device must to be able to reconstruct the Ethernet clock of the transmitting network device. However, no mechanism currently exists to enable reconstruction of the Ethernet clock at the receiving network device.

SUMMARY

Embodiments of the present disclosure are directed to retaining clock traceability when transporting mutually asynchronous traffic over the same medium. A network element within a network includes an input port, a processor and an output port. The input port is configured to couple to a first transport medium to receive first traffic from the network. The processor is configured to generate a plurality of multi-frames, in which each of the plurality of multi-frames includes first traffic, second traffic and a timestamp field. The first traffic and the second traffic are each synchronized to different respective clock sources. Each of the multi-frames is synchronized to the clock source of the second traffic. The processor is further configured to recover an original clock signal from the first traffic, divide down the original clock signal to a reduced clock signal having a frequency lower than the original clock signal and determine whether a rising edge of the reduced clock signal occurs within a multi-frame of the plurality of frames. When the rising edge of the reduced clock signal occurs within the multi-frame, the processor is configured to determine a delay from a beginning of the frame to the rising edge of the clock signal and set a timestamp within the timestamp field of a next multi-frame of the plurality of frames to the delay. The output port is configured to couple to a second transport medium to transmit the plurality of multi-frames.

In another embodiment, a network element within a network includes an input port, a processor, a frequency-locked loop and an output port. The input port is configured to couple to a first transport medium in the network to receive a plurality of multi-frames, in which each of the multi-frames includes first traffic, second traffic and a timestamp field. The first traffic and the second traffic are each synchronized to different respective clock sources. Each of the multi-frames is synchronized to the clock source of the second traffic. The processor is configured to process a multi-frame of the plurality of multi-frames to extract the first traffic and a timestamp within the timestamp field of the multi-frame. When the timestamp is within a valid range, the processor is further configured to generate a reduced clock signal having a rising edge occurring after a beginning of a next multi-frame of the plurality of multi-frames with a delay offset determined by the timestamp. The frequency-locked loop is configured to produce a reconstructed clock signal corresponding to an original clock signal associated with the first traffic based on the reduced clock signal. The output port is configured to transmit the first traffic over a second transport medium in the network based on the reconstructed clock signal.

In still another embodiment, a method for retaining clock traceability over an asynchronous interface includes receiving a plurality of multi-frames over a first transport medium at a network element, in which each of the plurality of multi-frames includes first traffic, second traffic and a timestamp field. The first traffic and the second traffic are each synchronized to different respective clock sources. Each of the multi-frames is synchronized to the clock source of the second traffic. The method further includes processing a multi-frame of the plurality of multi-frames to extract the first traffic and a timestamp within the timestamp field of the multi-frame. When the timestamp is within a valid range, the method includes generating a reduced clock signal having a rising edge occurring after a beginning of a next multi-frame of the plurality of multi-frames with a delay offset determined by the timestamp and producing a reconstructed clock signal corresponding to an original clock signal associated with the first traffic based on the reduced clock signal. The method still further includes transmitting the first traffic over a second transport medium in the network based on the reconstructed clock signal.

In some embodiments of any of the above apparatus/methods, the first traffic is Ethernet traffic that is received from two or more Ethernet links, each having a respective Ethernet clock signal originated by a same source, and the original clock signal is selected from one of the Ethernet clock signals.

In some embodiments of any of the above apparatus/methods, the first traffic is Ethernet traffic that includes a plurality of Ethernet frames and at least one of the plurality of multi-frames includes data from at least a portion of one of the plurality of Ethernet frames.

In some embodiments of any of the above apparatus/methods, a phase-locked loop is configured to receive the original clock signal and remove jitter from the original clock signal to produce a clean clock signal, and the processor divides down the clean clock signal to produce the reduced clock signal.

In some embodiments of any of the above apparatus/methods, the reduced clock signal is a 1 pulse per second clock signal.

In some embodiments of any of the above apparatus/ methods, the timestamp field is reserved in each of the plurality of multi-frames such that the timestamp field is sent at a constant rate.

In some embodiments of any of the above apparatus/ methods, each of the multi-frames is an Optical Channel Transport Unit 2 (OTU2) frame, each of the OTU2 frames includes an Optical Channel Payload Unit 2 (OPU2) and the timestamp field is included within the OPU2.

In some embodiments of any of the above apparatus/ methods, the timestamp of the next multi-frame is set to a default value when the rising edge of the reduced clock is not detected within the multi-frame.

In some embodiments of any of the above apparatus/ methods, the timestamp field includes sixteen bits.

In some embodiments of any of the above apparatus/ methods, the frequency-locked loop includes an oscillator configured to produce the reconstructed clock signal, a phase comparator configured to receive the reconstructed clock signal and the reduced clock signal and further configured to produce a feedback signal indicative of a frequency difference between the reconstructed clock signal and the reduced clock signal and a digital to analog converter for tuning the oscillator based on the feedback signal.

In some embodiments of any of the above apparatus/ methods, a phase-locked loop is configured to up-convert the reconstructed clock signal to the original Ethernet clock signal.

In some embodiments of any of the above apparatus/ methods, the processor is configured to take no action when the timestamp is set to a default value or not within a valid range.

In some embodiments of any of the above apparatus/ methods, the second traffic includes Common Public Radio Interface traffic.

DETAILED DESCRIPTION OF THE INVENTION

Figure 1:
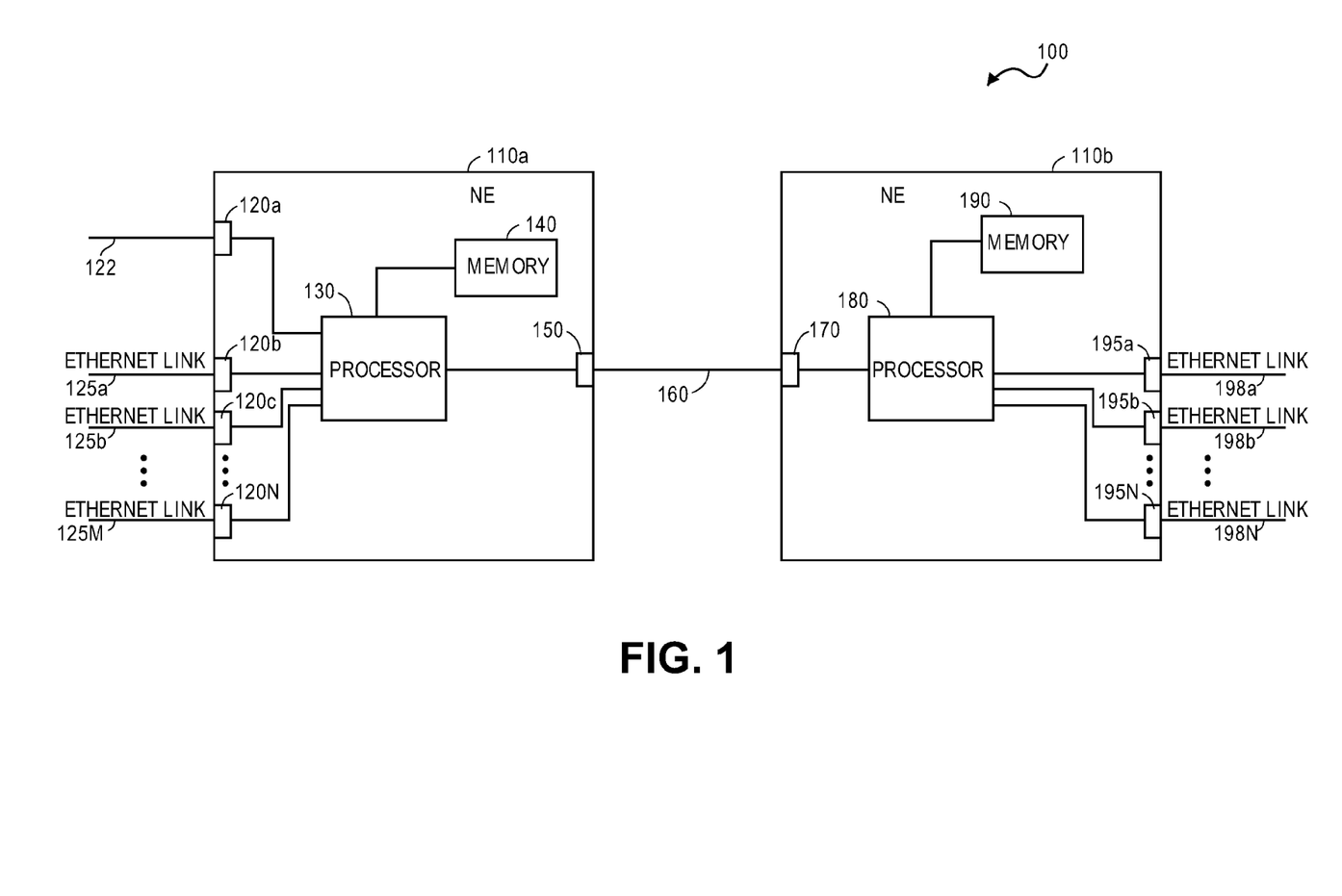
FIG. 1 illustrates a schematic block diagram of exemplary network elements within a communication network capable of retaining clock traceability over an asynchronous interface.

FIG. 1 illustrates a schematic block diagram of exemplary network elements (NEs) 110a and 100b within a communication network 100 capable of retaining clock traceability over an asynchronous interface. NE 110a includes a plurality of input ports 120a, 120b, 120c, . . . 120N, a processor 130, a memory 140 and an output port 150. The input ports 120a, 120b, 120c . . . 120N are coupled to respective links, where at least two of the links are synchronized to different clock sources. For example, input port 120b can be coupled to a first type of link 125a to receive first traffic that is synchronized to a first clock source, while input port 120a can be coupled to a second type of link 122 to receive second traffic that is synchronized to a second clock source different from the first clock source.

In an exemplary embodiment, input port 120a is coupled to an upstream communication link 122 to receive non-Ethernet traffic, while input ports 120b, 120c . . . 120N are coupled to respective Ethernet links 125a, 125b, . . . 125M to receive Ethernet traffic. Output port 150 is coupled to a transport medium 160 providing the asynchronous interface carrying both Ethernet and non-Ethernet traffic between NE 110a and NE 110b. It should be understood that the transport medium 160 can include one or more links, such as Optical Transport Network (OTN) links.

NE 110b includes an input port 170, processor 180, memory 190 and output ports 195a, 195b, . . . 195N. Input port 170 is coupled to the transport medium 160, while output ports 195a, 195b, . . . 195N are coupled to respective Ethernet links 198a, 198b, . . . 198N. It should be understood that each of the NEs 110a and 110b may include ports coupled to one or more Ethernet links to transmit and/or receive Ethernet traffic, and may further include one or more additional ports coupled to other communication links to transmit and/or receive non-Ethernet traffic.

Each of the NEs 110a and 110b, may be, for example, a switch, router, base station equipment or other networking equipment. For example, in an exemplary embodiment, NE 110a and 110b collectively form a radio base station system that communicates Common Public Radio Interface (CPRI) traffic over the transport medium 160. In this embodiment, NE 110a may be, for example, a Radio Equipment Control (REC) 210, and NE 110b, may be a Radio Equipment (RE) 260, or vice-versa. As is understood, the REC provides access to, for example, a Radio Network Controller (not shown) via an upstream communication link (e.g., link 122). In Universal Mobile Telecommunications Systems, this upstream communication link is referred to as the Iub interface. The RE serves as the air interface to the mobile user equipment (not shown). In general, the REC includes the radio functions of the digital baseband domain, whereas the RE includes the analog radio frequency functions. For example, when connecting a REC and a RE with one or several CPRI links 160, the resulting entity may be referred to as a Node B in a WCDMA (Wideband Code Division Multiple Access) Radio Access Network.

In an exemplary operation, NE 110a receives non-Ethernet traffic via input port 120a and Ethernet traffic via one or more of input ports 120b, 120c, . . . 120N. The processor 130 receives the Ethernet traffic and non-Ethernet traffic and generates a plurality of multi-frames including both the Ethernet traffic and non-Ethernet traffic for transmission over the transport medium 160 via output port 150. In an exemplary embodiment, the memory 140 includes one or more algorithms executable by the processor 130 to generate and transmit the multi-frame over the transport medium 160.

The Ethernet traffic on each Ethernet link 125a, 125b . . . 125M is received by the processor 130 as a plurality of Ethernet frames or packets. A certain number of bytes in each multi-frame can be reserved to carry Ethernet traffic. The number of bytes allocated to carry Ethernet traffic is programmable based on the expected bandwidth of the Ethernet traffic. In an exemplary embodiment, at least one of the multi-frames includes at least a portion of an Ethernet frame. However, Ethernet frame data may not be included in each of the multi-frames, depending on when Ethernet frames are received relative to the generation of the multi-frames.

Each of the multi-frames is synchronized to the clock source of the non-Ethernet traffic. In addition, each of the multi-frames further includes a timestamp field including a timestamp that allows NE 110b to reconstruct the original Ethernet clock of Ethernet links 125a, 125b, . . . 125M. The timestamp reflects the timing of a reduced clock locked to the incoming Ethernet clock on Ethernet links 125a, 125b, . . . 125M. In an exemplary embodiment, the reduced clock is a 1 Hertz (Hz)/1 Pulse Per Second (PPS) clock signal.

In addition, the timestamp field is reserved in each of the multi-frames such that the timestamp is sent at a constant rate. In an exemplary embodiment, the timestamp is sent every 12.194 µs. In embodiments in which the transport medium 160 includes an OTN link, each of the multi-frames may be an Optical Channel Transport Unit 2 (OTU2) frame and the timestamp filed can be reserved within a payload of the OTU2 frame, referred to herein as the Optical Channel Payload Unit 2 (OPU2).

In an exemplary operation, the Ethernet clocks on each of the Ethernet links 125a, 125b, . . . 125M are recovered by the processor 130. If the Ethernet clocks are traced to the same source, the processor 130 selects one of the Ethernet clocks and divides down the Ethernet clock to a 1 Hz clock signal. When the rising edge of the 1 Hz clock occurs within a multi-frame, the delay from the beginning of the multi-frame to the 1 Hz clock rising edge is recorded as the timestamp (with a resolution of, e.g., 1/334.65 Hz). The processor 130 then inserts the timestamp in the timestamp field of the next multi-frame immediately following the multi-frame in which the rising edge was detected. When no rising edge is detected, the timestamp in the timestamp field of the next multi-frame is set to a default value. In an exemplary embodiment, the default value is 0xffff, which is greater than the allowed range (i.e., beyond 12.1914 µs), so that NE 110b can determine that no rising edge was detected.

At the receiving NE 110b, the multi-frames are received by the processor 180 via input port 170. The processor 180 processes the multi-frames to extract the Ethernet traffic and to transmit the extracted Ethernet traffic onto one or more Ethernet links 198a, 198b, . . . 198N via output ports 195a, 195b, . . . 195N. The processor 180 further uses the timestamps in the multi-frames to reconstruct the original Ethernet clocks prior to transmitting the Ethernet traffic over Ethernet links 198a, 198b, . . . 198N. In an exemplary embodiment, the memory 190 includes one or more algorithms executable by the processor 180 to process the multi-frame and transmit the extracted Ethernet traffic over the Ethernet links 198a, 198b, . . . 198N.

In an exemplary operation, the processor 180 receives a multi-frame via input port 170 and processes the multi-frame to extract any Ethernet frames and the timestamp from the timestamp field therein. When the timestamp is set to the default value or is otherwise not within a valid range, no action is taken by the processor 180. However, when the timestamp is not set to the default value and is within a valid range, the processor 180 uses the timestamp to generate a rebuilt 1 Hz (1 PPS) clock signal with its rising edge occurring after the beginning of the next multi-frame with a delay offset as specified by the timestamp. The rebuilt 1 Hz clock signal has the same clock frequency as the reduced clock signal derived from the original Ethernet clock of Ethernet links 125a, 125b, . . . 125M. The processor 180 then uses the rebuilt 1 Hz clock to reconstruct the original Ethernet clock.

If the original Ethernet clocks on each of Ethernet links 125a, 125b, . . . 125M are traced to the same source, the processor 130 provides the reconstructed Ethernet clock signal to each of Ethernet links 198a, 198b, . . . 198N. In addition, when the multi-frame includes Ethernet traffic from multiple Ethernet links (multiple Ethernet streams), the processor 180 further identifies each of the Ethernet streams included in the multi-frame, determines the output Ethernet link 198a, 198b, . . . 198N for each of the Ethernet streams and transmits each Ethernet stream on the associated output Ethernet link 198a, 198b, . . . 198N.

It should be understood that although the asynchronous transport medium 160 is described herein as carrying both Ethernet traffic and non-Ethernet traffic, in other embodiments, the asynchronous transport medium 160 can carry two other types of traffic, in which each type of traffic is synchronized to a different clock source.

Figure 2:
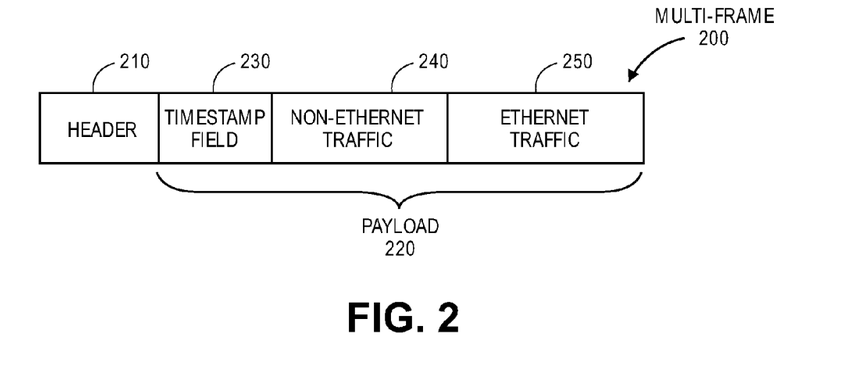
FIG. 2 illustrates an exemplary format of a multi-frame transmitted over the asynchronous interface.

FIG. 2 illustrates an exemplary format of a multi-frame 200 for carrying both Ethernet and non-Ethernet traffic. The multi-frame 200 includes a header 210 and a payload 220. The payload 220 includes a timestamp field 230, bytes reserved for non-Ethernet traffic 240 and bytes reserved for Ethernet traffic 250. The timestamp field 230 may include, for example, 16 bits, within which the timestamp is provided. As described above, in embodiments in which the multi-frame is an OTU2 frame, the payload is referred to as an OPU2 frame. Although the timestamp field 230 is included within the OPU2 frame, the timestamp is recorded as the delay from the beginning of the OTU2 frame to when the rising edge of the reduced clock signal occurred within the OTU2 frame. As also described above, this timestamp would then be included in the next multi-frame 200 immediately following the multi-frame in which the rising edge occurred.

Figure 3:
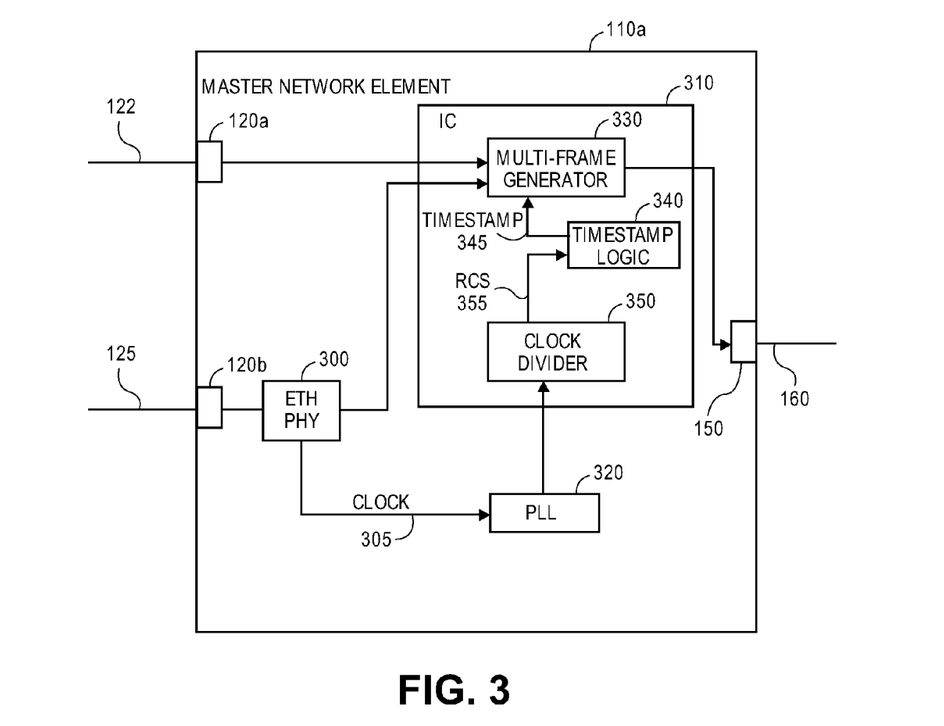
FIG. 3 illustrates an exemplary network element for generating a multi-frame to retain clock traceability.

FIG. 3 illustrates an exemplary network element 110a for generating a multi-frame to retain clock traceability. The network element 110a in FIG. 3 is a master network element, such as a REC, that includes a plurality of input ports (two of which, 120a and 120b, are shown for convenience), an Ethernet PHY 300, an Integrated Circuit (IC) 310, a Phase-Locked Loop (PLL) 320 and an output port 150. Input port 120a is coupled to an upstream communication link 122 to receive non-Ethernet traffic, while input port 120b is coupled to an Ethernet link 125 to receive Ethernet traffic. Output port 150 is coupled to a transport medium 160 providing an asynchronous interface to carry both Ethernet traffic and non-Ethernet traffic. The IC 310 includes a multi-frame generator 330, timestamp logic 340 and a clock divider 350. The IC 310 may be, for example, a Field-Programmable Gate Array (FPGA).

In an exemplary operation, non-Ethernet traffic received via input port 120a is provided to the multi-frame generator 330. In addition, Ethernet traffic received via input port 120b is provided to the multi-frame generator 330 via Ethernet PHY 300. The multi-frame generator 330 generates a plurality of multi-frames including the Ethernet traffic and non-Ethernet traffic and provides the generated multi-frames to the output port 150 for transmission via transport medium 160. Each of the multi-frames is synchronized to the clock source of the non-Ethernet traffic.

The Ethernet PHY 300 further recovers the Ethernet clock 305 from the Ethernet link 125. For example, in an exemplary embodiment, the Ethernet clock is a 1000Base-X SERDES (Serializer/Deserializer) RX clock. The recovered Ethernet clock 305 is then fed into the PLL 320 to remove excessive jitter from the Ethernet clock 305. After PLL clean-up, the clean clock signal is then fed to the clock divider 350 in the IC 310. The clock divider 350 divides down the clean clock signal to produce a reduced clock signal. In an exemplary embodiment, the reduced clock signal is a 1 Hz (1 PPS) clock.

The reduced clock signal (RCS) 355 is fed into the timestamp logic 340, which determines whether a rising edge of the RCS 355 occurs within a multi-frame currently being generated by the multi-frame generator 330. If a rising edge of the RCS 355 is detected by the timestamp logic 340 within the current multi-frame, the timestamp logic 340 determines the delay from the beginning of the current multi-frame to the rising edge and records this delay as the timestamp 345 within the next multi-frame immediately following the current multi-frame. If a rising edge of the RCS 355 does not occur within the current multi-frame, the timestamp logic 340 sets the timestamp 345 of the next multi-frame immediately following the current multi-frame to a default value (e.g., 0xffff).

Figure 4:
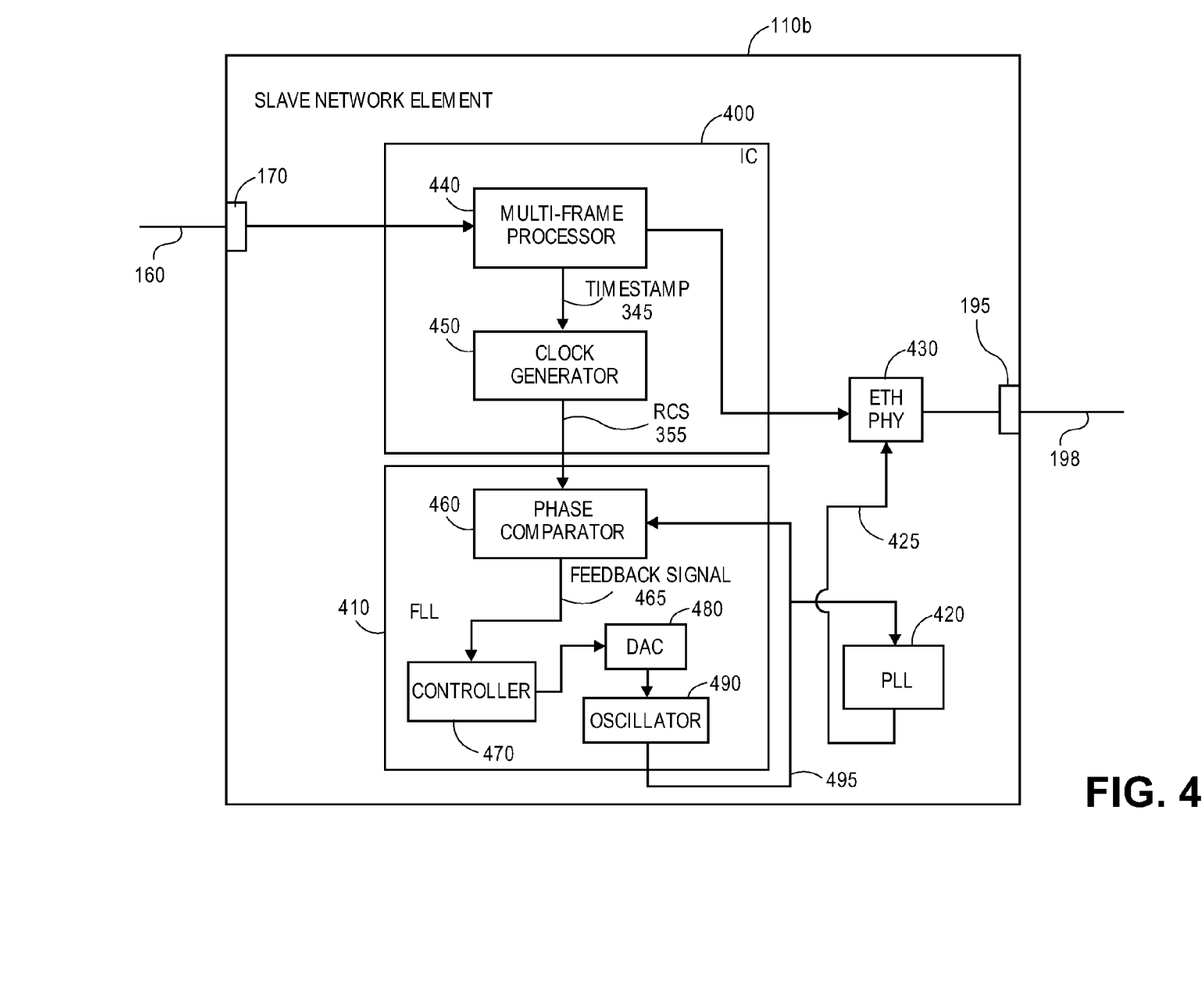
FIG. 4 illustrates an exemplary network element for processing a multi-frame to retain clock traceability.

FIG. 4 illustrates an exemplary network element 110b for processing a multi-frame to retain clock traceability. The network element 110b in FIG. 4 is a slave network element, such as an RE, that includes at least one input port 170, an Integrated Circuit (IC) 400, a Frequency-Locked Loop (FLL) 410, a Phase-Locked Loop (PLL) 420, an Ethernet PHY 430 and an output port 195. Input port 170 is coupled to the transport medium 160 to receive the multi-frames carrying Ethernet and non-Ethernet traffic. Output port 195 is coupled to Ethernet link 198 to transmit the received Ethernet traffic.

The IC 400 includes a multi-frame processor 440 and a clock generator 450. The FLL 410 includes a phase comparator 460, controller 470, a Digital-to-Analog converter (DAC) 480 and an oscillator 490. The oscillator 490 may be, for example, a Voltage-Controlled, Temperature-Compensated Crystal oscillator (VCTCXO). In other embodiments, various components, such as the phase comparator 460 and/or Ethernet PHY 430 may be implemented inside the IC 400. The IC 400 may be, for example, a Field-Programmable Gate Array (FPGA).

In an exemplary operation, a multi-frame received on transport medium 160 via input port 170 is provided to the multi-frame processor 440 for processing. For example, the multi-frame processor 440 can process the multi-frame to extract any Ethernet traffic from the multi-frame and to further extract a timestamp 345 in the timestamp field of the multi-frame. When the timestamp 345 is set to the default value or is otherwise not within a valid range, no action is taken by the IC 400. When the timestamp 345 is not set to the default value and is within a valid range, the timestamp 345 is fed to the clock generator 450 to generate a rebuilt reduced clock signal having a rising edge occurring after a beginning of a next multi-frame received by the multi-frame processor 440 with a delay offset determined by the timestamp 345. The reduced clock signal (RCS) 355 has the same clock frequency as the original Ethernet clock signal as seen by the transmitting (master) network device. In addition, any jitter in the RCS 355 is due to the sampling resolution error. In an exemplary embodiment, the sampling resolution error is 1/334.65 MHz.

The RCS 355 is used as a reference to run the FLL 410. The FLL 410 operates to produce a reconstructed clock signal 495 corresponding to the original Ethernet clock signal. For example, the reconstructed clock signal 495 and RCS 355 are input to the phase comparator 460, which produces a feedback signal 465 indicative of a frequency difference between the reconstructed clock signal and the reduced clock signal. The feedback signal 465 is then provided to the controller 470, which controls the DAC 480 to enable the DAC 480 to tune the oscillator 490 based on the feedback signal 465. The bandwidth of the FLL 410 and the characteristics of the oscillator 490 are determined, for example, based on the phase noise requirements of the network.

The output of the oscillator 490 is provided to the PLL 420 to up-convert the reconstructed clock signal 495 to an up-converted clock signal 425 having the frequency used by the Ethernet PHY 430 to generate the 1000Base-X SERDES TX clock. In an exemplary embodiment, the reconstructed clock signal 495 is a 20 MHz clock, and the up-converted clock signal 425 is a 125 MHz clock. In other embodiments, the output of the oscillator 490 may be a 125 MHz clock signal, and the PLL 420 may serve to remove excessive jitter in the clock signal.

Figure 5:
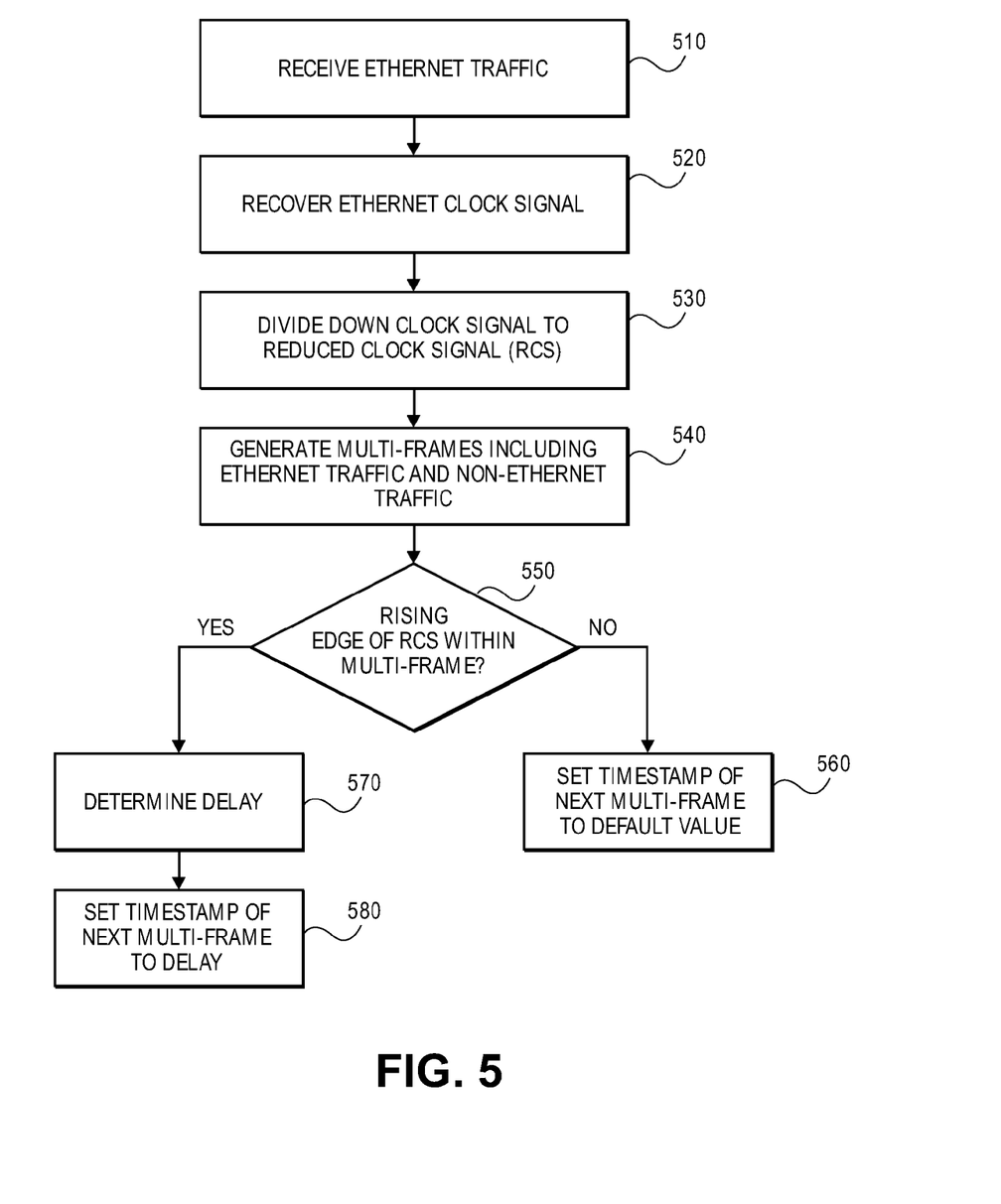
FIG. 5 illustrates an exemplary flow diagram of a method for retaining clock traceability over an asynchronous interface.

FIG. 5 illustrates an exemplary flow diagram of a method 500 for retaining clock traceability over an asynchronous interface. The method begins at 510, where Ethernet traffic is received via one or more Ethernet links at a network element within the network. For example, in an exemplary embodiment, the Ethernet traffic is received at the REC or RE of a radio base station system. At 520, the network element recovers the Ethernet clock signal on the Ethernet link, and at 530, divides down the Ethernet clock signal to a reduced clock signal (RCS).

At 540, the network element generates one or more multi-frames, each configured to carry both Ethernet traffic and non-Ethernet traffic and each synchronized to the clock source of the non-Ethernet traffic. At 550, the network element determines whether a rising edge of the RCS occurs within a current multi-frame. If not, at 560, the network element sets a timestamp within a next multi-frame immediately following the current multi-frame to a default value. However, if the rising edge of the RCS does occur within the current multi-frame, at 570, the network element determines a delay from the beginning of the current multi-frame to the rising edge of the RCS, and at 580, records the delay as the timestamp in the next multi-frame immediately following the current multi-frame.

Figure 6:
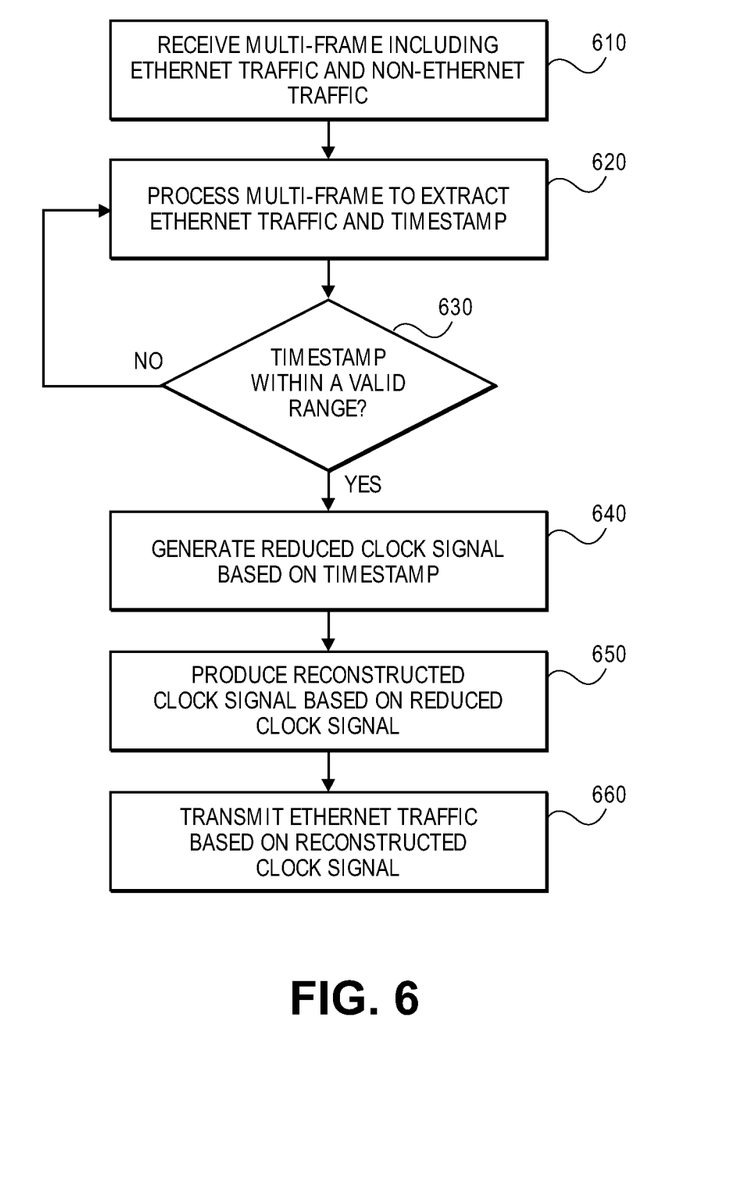
FIG. 6 illustrates an exemplary flow diagram of another method for retaining clock traceability over an asynchronous interface.

FIG. 6 illustrates another exemplary flow diagram of a method 600 for retaining clock traceability over an asynchronous interface. The method begins at 610, where a plurality of multi-frames carrying both Ethernet traffic and non-Ethernet traffic are received via an asynchronous interface at a network element within a network. For example, in an exemplary embodiment, the multi-frames are received at the REC or RE of a radio base station system via a CPRI link.

At 620, the network element processes a current multi-frame to extract the Ethernet traffic and a timestamp from the current multi-frame. At 630, the network element determines whether the timestamp is within a valid range. If not, the method returns to 620 to process the next received multi-frame. If the timestamp is within a valid range, at 640, the network element generates a reduced clock signal based on the timestamp. In an exemplary embodiment, the reduced clock signal has a rising edge occurring after the beginning of the next multi-frame with a delay offset determined by the timestamp. At 650, the network element further produces a reconstructed clock signal corresponding to the original Ethernet clock signal associated with the Ethernet traffic based on the reduced clock signal. At 660, the extracted Ethernet traffic is then transmitted back out onto one or more Ethernet links based on the reconstructed clock signal. As used herein, the term "processor" is generally understood to include one or more processing devices used in network equipment, such as microcontrollers, Field Programmable Gate Arrays (FPGAs), multi-core processors or a combination thereof. In addition, as used herein, the term "memory" may include one or more of a data storage device, random access memory (RAM), read only memory (ROM), flash memory, database or other type of storage device or storage medium.

As may also be used herein, the terms "operable to" or "configured to" indicates that an item includes one or more of processing modules, data, input(s), output(s), etc., to perform one or more of the described corresponding functions and may further include inferred coupling to one or more other items to perform the described or necessary corresponding functions. In addition, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to". As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may still further be used herein, inferred coupling (i.e., where one element is coupled to another element by inference) includes direct and indirect coupling between two items in the same manner as "coupled to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network element within a network, comprising:
a first input port configured to couple to a first transport medium to receive first traffic from the network, wherein the first traffic includes Ethernet frames from two or more Ethernet links, each having a respective Ethernet clock signal originated by a same source;
a second input port configured to couple to a second transport medium to receive second traffic, wherein the second traffic includes non-Ethernet frames;
a processor configured to:
recover an original clock signal from the non-Ethernet frames;
divide down the original clock signal to a reduced clock signal having a frequency lower than the original clock signal;
generate a plurality of multi-frames by:
inserting in each of the plurality of multi-frames the Ethernet frames from two or more Ethernet links being synchronized to the reduced clock signal and non-Ethernet frames being synchronized to the original clock signal;
generating in each of the plurality of multi-frames a timestamp field from which the reduced clock source is derived, wherein the timestamp field is reserved in each of the multi-frames such that the timestamp field is transmitted at a constant rate;
synchronizing each of the plurality of multi-frames to the original clock signal of the second traffic;
determine whether a rising edge of the reduced clock signal occurs within a multi-frame of the plurality of multi-frames;
when the rising edge of the reduced clock signal occurs within the multi-frame, determine a delay from a beginning of the multi-frame to the rising edge of the clock signal;
set a timestamp within the timestamp field of a next multi-frame of the plurality of multiframes to the delay;
set the timestamp within the timestamp field of the next multi-frame to a default value when the rising edge of the reduced clock is not detected within the multi-frame,
wherein the timestamp field is reserved in each of the plurality of multi-frames such that the timestamp field is sent at a constant rate; and
an output port configured to couple to a third transport medium to transmit the plurality of multi-frames.

2. The network element of claim 1, wherein the multi-frame includes a payload with bytes reserved for the Ethernet frames and bytes reserved for the non-Ethernet frames; and wherein a number of the bytes allocated for the Ethernet frames is adjustable based on an expected bandwidth of the first traffic.

3. The network element of claim 1, further including:
a phase-locked loop configured to receive the original clock signal and remove jitter from the original clock signal to produce a clean clock signal, the processor dividing down the clean clock signal to produce the reduced clock signal.

4. The network element of claim 1, wherein the reduced clock signal is a 1 pulse per second clock signal.

5. The network element of claim 1, wherein:
each of the multi-frames is an Optical Channel Transport Unit 2 (OTU2) frame;
each of the OTU2 frames includes an Optical Channel Payload Unit 2 (OPU2); and
the timestamp field is included within the OPU2.

6. The network element of claim 1, wherein the timestamp field includes sixteen bits.

7. The network element of claim 1, wherein the second traffic includes Common Public Radio Interface traffic.

* * * * *